INVENTORS
LAWRENCE E. VERBARG
ALLAN J. SUMMERS, DECEASED
BY: ROZEMA L. SUMMERS, ADMINISTRATRIX
BY: *Gravely Lieder & Woodruff*
ATTORNEYS INVENTORS
LAWRENCE E. VERBARG
ALLAN J. SUMMERS, DECEASED
BY: ROZEMA L. SUMMERS, ADMINISTRATRIX BY Gravely, Lieder & Woodruff
ATTORNEYS

United States Patent Office 3,562,708
Patented Feb. 9, 1971

3,562,708
DEVICE TO ELIMINATE UNDESIRABLE
TRANSIENT EFFECTS ON COMPUTER
OPERATIONS AND THE LIKE
Lawrence E. Verbarg, Kirkwood, Mo., and Allan J. Summers, deceased, late of Kirkwood, Mo., by Rozema L. Summers, administratrix, Kirkwood, Mo., assignors to McDonnell Douglas Corporation, St. Louis County, Mo., a corporation of Maryland
Continuation-in-part of application Ser. No. 299,119, July 31, 1963. This application June 24, 1968, Ser. No. 740,833
Int. Cl. G06f 11/00; G11c 7/02
U.S. Cl. 340—146.1                10 Claims

ABSTRACT OF THE DISCLOSURE

A device for preventing data signals that may be adversely affected by exposure to nuclear radiations or other transient conditions from replacing earlier received data signals in computer and like devices including means for temporarily storing data signals in a condition in which they are relatively unlikely to be adversely affected by exposure to nuclear radiations and other transient conditions, comparing the temporarily stored data signals with later received data signals to determine the amount of difference therebetween, and substituting the temporarily stored data signals for the later received data signals whenever the amount of the difference therebetween exceeds a preestablished amount.

---

This is a continuation-in-part of our earlier filed copending application Ser. No. 299,119, filed July 31, 1963, and now abandoned and assigned to the same assignee.

The present invention relates generally to devices for use with computers and the like and more particularly to a device which prevents undesirable transient effects such as might be produced as a result of exposure to nuclear radiation or other temporary disturbance from causing bad or inaccurate data to be produced or read into the computer.

Many different kinds of computers are in use at the time of this writing, and many of these devices include control circuits with solid state and semi-conductor elements therein. It is known that these and other elements are apt to be adversely effected by certain environmental conditions including conditions of high radiation such as is produced during an atomic explosion or other temporary condition. Furthermore, these adverse conditions will cause such devices to malfunction with the result that bad information will get into the computer and cause errors with the resulting undesirable results. The subject device, however, includes means which are able to recognize the receipt of such inaccurate information, and prevents the bad information from replacing previously received information which is more accurate. To accomplish this the present device makes use of certain desirable characteristics of magnetic or similar devices which are relatively unaffected under the same or similar temporary unfriendly or adverse conditions. In the present device the magnetic means are used for storing information until it can be determined whether the information is likely to be reliable enough to be fed to the computer. To determine the reliability of the information temporarily stored in the magnetic means a comparison is made between the newest stored information and other information previously stored. If the comparison difference between the newly stored information and the previously stored information is within predetermined limitations then the newly stored information is presumed to be accurate and is made available to the computer and replaces older information previously transferred thereto. If, however, the comparison difference is greater than the predetermined difference, that is to say the new information differs from the earlier stored information by greater than the predetermnied amount, this means that the newly stored information is probably inaccurate due to the presence of some adverse condition such as excessive radiation. The amount of charge required to prevent the new information from being fed to the computer can be varied depending upon the type of information and the amount of variation expected therein within a predetermined time interval. This makes the present device particularly applicable to computer operations which continuously receive information and when the information is not expected to vary at greater than a predetermined rate, and is not expected to have sharp or sudden variations.

Briefly, the present device comprises a data cell or data register having an input connected to a signal source, and an output connected to a computer or the like, means for temporarily storing samples of the input signals taken at predetermined time intervals, and means for comparing the signals stored at succeeding time intervals, said comparing means including means for preventing the later of two temporarily stored signals from being fed to the computer whenever the difference between the compared signals is greater than a predetermined amount, said temporary storage means including magnetic means and means for reading in and reading out information thereto.

A principal object of the present invention is to provide means for preventing erroneous information from being used in a computer or the like.

Another object is to provide means for temporarily storing information in a device which is relatively unaffected by an unfriendly environmental condition such as an environment of intense nuclear radiation.

Another object is to enable computers and the like to operate reliably during periods when certain elements thereof are likely to malfunction.

Another object is to provide temporary data storage means capable of storing data samples at preselected time intervals.

Another object is to provide means for preventing good information from being replaced by bad information during periods of temporary adverse conditions.

Another object is to provide relatively simple and inexpensive means for making computers and other similar devices reliable even under temporary adverse conditions which are likely to cause some parts thereof to malfunction.

Another object is to provide improved means for comparing information received at different time intervals.

Another object is to provide magnetic storage means capable of storing information bits taken at predetermined time intervals, said storage means being relatively unaffected by temporary adverse environmental conditions such as intense radiation and heat.

These and other objects and advantages of the present invention will become apparent after considering the following detailed specification covering a preferred embodiment of the invention in conjunction with the accompanying drawings, wherein.

Figure 1:
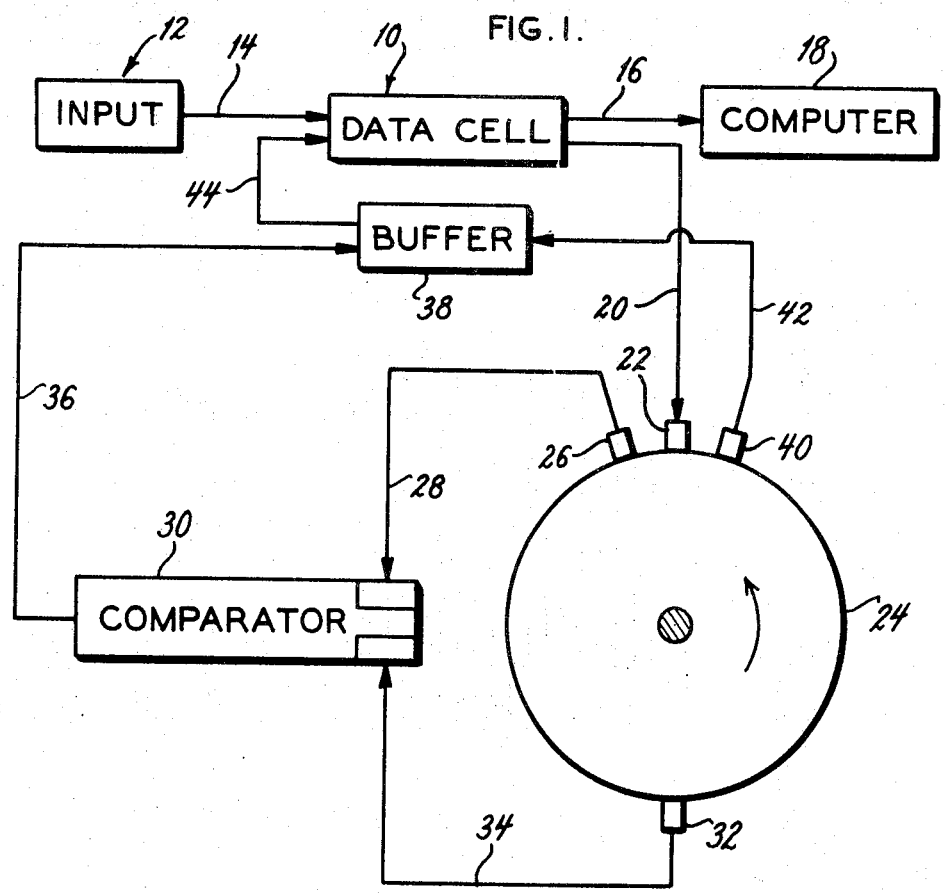
FIG. 1 is a block diagram of a device constructed according to the present invention.

Referring to the drawings by reference numbers, the number 10 refers to a data cell or shift register which is connected at its input to an input signal source 12 by a wire cable 14 and at its output by another wire cable 16 to a computer device 18. The computer 18 uses the information it receives from the data cell 10 to make calculations.

The data cell 10 also has a second output cable 20 which is connected to a write head 22 which is positioned adjacent to a rotating magnetic storage drum 24 on which preselected portions of the input information are temporarily stored. The drum 24 is shown in FIG. 1 positioned to rotate in a counterclockwise direction as indicated by the arrow and is fed information at predetermined time intervals depending on the nature of the input information and the speed of rotation of the drum. The surface of the drum 24 is constructed of suitable magnetizable material capable of having information stored thereon by the write head 22. Shortly after a bit of information is stored in the drum 24, the same stored bit (or bits) will pass another head 26 which is a read head and will be read out thereby but not erased from the drum. The read head 26 is connected by a cable 28 to one of two inputs to a comparator unit 30.

At about the same time that the write head 22 and the read head 26 are operating as aforesaid, another read head 32, which is positioned on the opposite side of the drum 24 is reading out other information bits that were previously stored on the drum about a half a revolution earlier. The information read by the read head 32 is also fed to the comparator unit 30 on another cable 34. The comparator unit 30 receives the two separate input signals read from opposite sides of the drum almost simultaneously and includes means for comparing the two signals to determine the amount of difference therebetween. If the difference is less than a predetermined amount the comparator circuit 30 will not need to function further, and this means that the input signals are provably reliable and therefore can be fed to and used by the computer.

If the difference between the two compared signals is greater than the predetermined amount, however, the comparator circuit 30 will emit a control impulse on lead 36 which will be fed to a buffer circuit 38. The control impulse thus produced will be used to control the operation of the buffer circuit 38 in a manner that will be described hereinafter.

If the buffer circuit 38 receives a control impulse from the output of the comparator circuit 30 this means that an erroneous input has been received, and it establishes a circuit so that at a later time another read head 40 located adjacent to the drum 24 will read out the earlier of the two compared signals and will feed this signal to the buffer circuit 38 on lead 42. However, since the buffer circuit 38 also received a control impulse from the comparator unit 30, it will be controlled thereby to pass the signal received on lead 42 to the input of the data cell 10 on another lead 44. The signal thus passed will then be used by the data cell 10 instead of the normal input signals from the input source. This source signal will also be passed along by the data cell 10 to the write head 22 to be again stored on the drum 24 for comparison with a still later input signal a half revolution later.

It can therefore be seen that in any situation where succeeding samples of the input signal differ by more than a predetermined amount due to some unusual condition such as an atomic explosion, a momentary power failure, excessive radiation or heat, or any of a number of other possible temporary conditions, the data received during these periods, if the periods are of relatively short duration, will not be used or replace previously received good information. Instead the earlier received accurate information will continue to be reused until a favorable comparison condition is again obtained. The subject device is able to accomplish this desirable result primarily because it employs magnetic storage means which are relatively unaffected by the above described adverse conditions.

The present invention is particularly useful with computer devices which employ solid state or semi-conductor devices such as are used in many different kinds of gate circuits. Such devices, when exposed to the conditions described above, tend to lose their switching characteristics and in most cases act like conductors. Obviously, when this occurs wrong information will be produced and transferred between circuits unless some means, such as the present device, is provided. Furthermore, if the computer is used in a control or guidance system of a vehicle such as an air or space vehicle, the receipt and use, even momentarily, of wrong information can have disastrous results.

Figure 2:
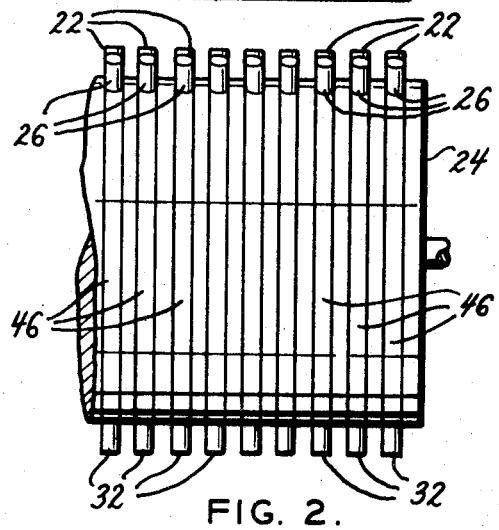
FIG. 2 is a fragmentary elevational view of a magnetic storage device for use with the present device; and, FIG. 3 is a schematic circuit diagram showing in detail another embodiment of the present device.

The magnetic drum storage device 24 of the present invention can be constructed to have one or more data bands 46 and can be used with one or more shift registers. Each such band in a ganged construction will be provided with its own read and write heads similar to the heads 22, 26, 32 and 40. A typical magnetic drum 24 with a plurality of adjacent or ganged storage sections or bands 46, each provided with its own read and write heads, is shown in FIG. 2. Other drum constructions and locations for the heads are also possible, and the particular construction shown is merely for illustrative purposes.

The information stored in the data cell or shift register 10 can be transferred to the write head 22 under command of the computer program (not shown), and the time schedule for such transfers can be prearranged as desired and also programed. Furthermore, if the drum has more than one storage band other circuits will be required to properly distribute the information. It is also important that the speed of the drum rotation be synchronized with the operation of the read and write heads, and that the time intervals for taking sample readings of the input be selected with the amount of expected signal variation in mind. It has also been found desirable to locate the two read out heads 26 and 32 so that they read out as nearly simultaneously as possible. Once an error is detected it is also contemplated to provide other control circuits which will prevent the data cell from giving up its last known accurate data for a predetermined time interval or until a favorable comparison is again established. Thus little or no error is likely to creep into the system unless the system is permitted to operate for a long time under changing circumstances without receiving any new reliable data. The present device, therefore, will enable computers and the like to operate reliably during periods of temporary interruption, but it is not designed primarily to enable a computer to operate indefinitely or for long periods on continuous information that is not updated. In the case of an atomic explosion, a momentary power failure or similar temporary interruptions or adverse conditions, the present device therefore affords means for retaining relatively reliable information in the operating circuits of a computer. Furthermore, under conditions which do not cause excessive data variations or fluctuations, the computer will continue to operate normally unaffected by the present device.

As previously mentioned, it is also desirable to locate the read head 26 as close as possible following the write head 22 to minimize the transfer time of information from the data cell to the comparator circuit 30. It is also desirable that the transient duration due to a temporary nuclear environment or other adverse condition be relatively short compared to the time required for the drum to rotate one-half revolution. This is not necessarily a strict requirement, however. Furthermore, the time required for transfer and comparison of data should be comparable or less than the times required for reading and writing on the storage drum for the most efficient operation.

Figure 3:
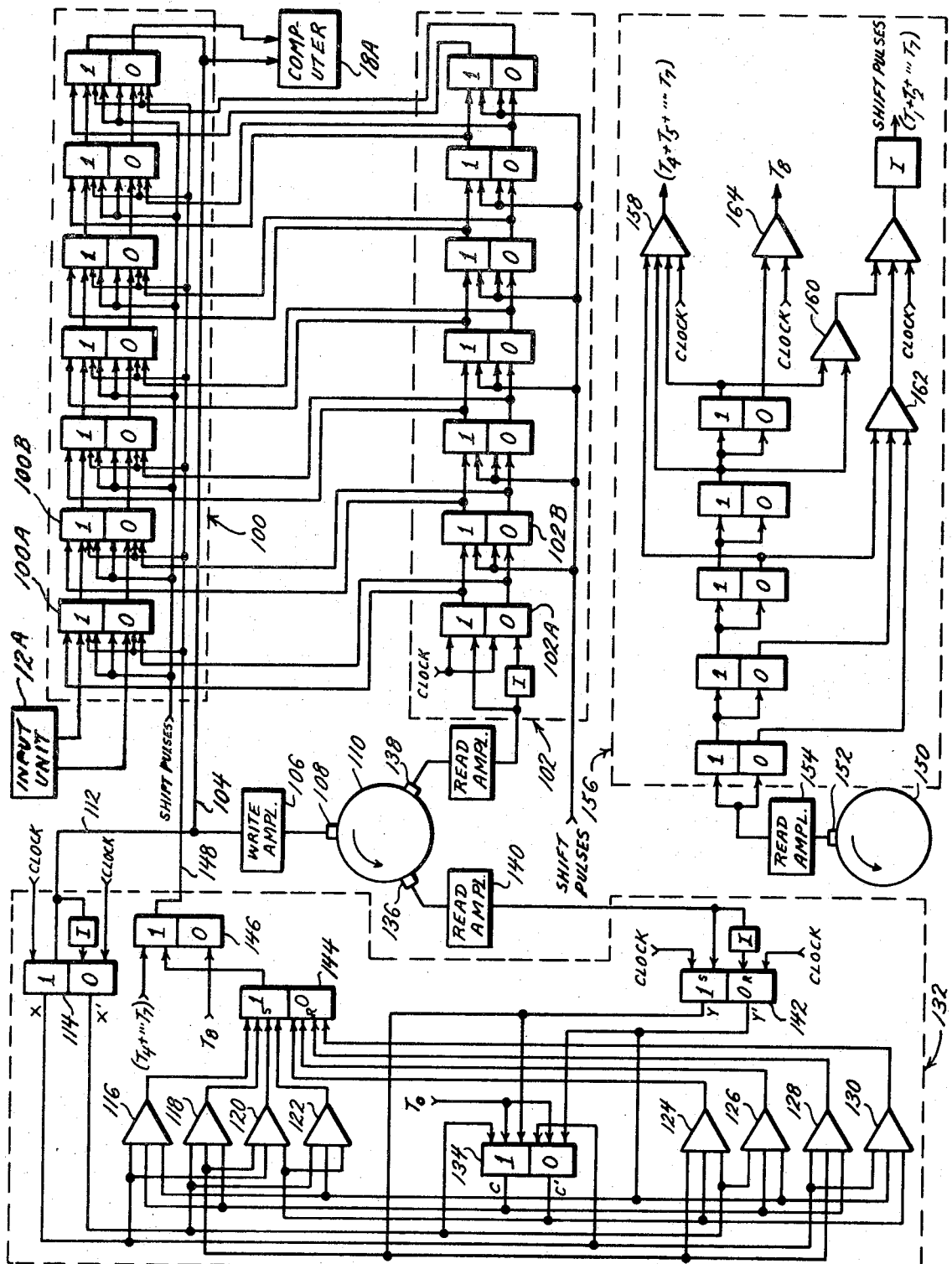

FIG. 3 is a circuit diagram in block form showing another embodiment of the present invention. The circuit of FIG. 3 includes first and second storage registers 100 and 102 which are shown as shift registers each including a plurality of succeeding bi-stable stages identified as stages 100A, 100B . . . 102A, 102B . . . and so on. The register 100 receives data signals from input unit 12A, stores such signals during the operation of the subject device, transfers such signals to computer device 18A if no transients have been detected which would cause such signals to change adversely, and accepts adequately correct signals from storage register 102 if transients have caused such signals to change adversely. Each stage of the shift registers 100 and 102 includes a high density flip-flop device including a core, and each stage has a plurality of inputs and outputs. In the particular embodiment disclosed the registers 100 and 102 each have seven binary stages which means that they can store a maximum number value equal to 127.

The output of the last stage of the shift register 100 is connected by lead 104 to the input side of write amplifier 106 which has its output side connected to a write head 108 positioned adjacent to rotatable magnetic information storage drum 110. The drum 110 may have a plurality of adjacent positions or bands depending on the capacity desired. The output of the shift register 100 is also connected by another lead 112 to the input side of a flop-flop circuit 114, and the flip-flop 114 has other inputs labeled clock inputs which are taken from the output of timer means which will be described later. The output sides of the flip-flop 114, labeled X and X' are connected to selected inputs of a plurality of "and" gate circuits 116, 118, 120 . . . 130 which are all included in a comparator circuit identified generally by the number 132. The outputs of the flip-flop circuit 114 are also connected as inputs to another flip-flop circuit 134 which has outputs labeled C and C' connected as other inputs to the gate circuits 116–130.

The storage drum 110 has first and second read heads 136 and 138 which are shown spaced at 120° intervals from the write head 108. The read head 136 senses impulses previously stored on the drum 110 at the head 108 and feeds these impulses to a read amplifier circuit 140 which in turn feeds them to the inputs of another flip-flop circuit 142 which receives other inputs from the clock of timing means. The flip-flop circuit 142 has outputs labeled Y and Y' which are likewise connected as other input to the "and" gates 116–130 and to the input side of the flip-flop circuit 134 as shown. It can therefore be seen that the comparator circuit 132 receives inputs from two sources namely, from the first shift register 100 and from signals previously stored on the drum 110 and sensed by the read head 136. The feeding of these signals is also controlled by the timing or clock signals.

The comparator circuit 132 compares the signals received from the two sources and produces an output whenever the signals differ by at least a predetermined amount. If the comparison is greater than the predetermined amount as determined by the "and" gates 116–130 which have their outputs connected to the input side of another high density flip-flop circuit 144, an output signal will be produced on the set side of the flip-flop 144. This signal will then be applied to the set side of an "or" flip-flop circuit 146 which has other inputs connected to receive other timing signals. When the "or" flip-flop circuit 146 receives a signal from the comparator circuit 132 it makes available an output signal which is applied to an enable input lead 148 of the storage register 100 to enable the information stored in the register 102 to be transferred to the register 100 to replace the information contained therein. The information in the register 102 which is transferred to the register 100 is the information read from the drum 110 by the read head 138. The transfer from storage register 102 to storage register 100 is made over leads which interconnect the outputs of each stage of the second storage register 102 and inputs to the corresponding stages of the storage register 100.

FIG. 3 also shows clock track means 150 which includes an extra band or position mounted on and movable with the storage drum 110. The clock track 150 is subdivided into a plurality of positions or bits (96 bits being a typical number of bits), and these bits are spaced about the drum and are sensed by a read head 152 which produces output timing pulses which are fed to a read amplifier 154. The amplifier 154 in turn feeds the timing pulses to a pulse generator circuit indicated generally by number 156. The timing pulse generator circuit 156 includes a plurality of serially connected flip-flop circuits connected as shown and arranged to produce outputs which are applied to "or" gate circuits 158, 160 and 162 and to "and" gate 164. In this way the circuit 156 produces timing or clock pulses which are used throughout the device and are necessary to its operation.

It can thus be seen that the circuit shown in FIG. 3 receives input signals from the shift register 100 and these are stored on the drum 110. At the same time signals previously stored on the drum 110 are compared with the new signals being stored and on the basis of this comparison the device is able to determine if the newly received signals are acceptable or not. If they are not acceptable it may be due to an atomic explosion or other transient condition in which case it is preferred to use previously stored signals to the newly arriving information even though some error may be introduced as a result. To accomplish this data previously stored in the register 102 is transferred to and replaces information already in the register 100. The amount of information that can be transferred in this way depends on the capacities of the shift registers 100 and 102 and the drum 110 all of which can be varied as required depending upon the duration of the transient conditions which are to be spanned and the rate at which new data signals are received.

The present invention has application to many different kinds of computers and like devices but is particularly well suited for use with devices having semiconductor or solid state circuits which are known to be adversely affected by nuclear radiation and other environmental conditions. Many of these applications will be suggested by the above specification and by the accompanying drawing. The subject device can also be used with different kinds of data such as data in binary coded form and analog data.

Thus there has been shown and described a novel device to enable computers and the like to operate accurately and reliably even during conditions of temporary interruption or malfunction due to atomic blast, temporary power difficulties, temporary excessive heat and other temporary conditions, which device fulfills all of the objects and advantages sought therefor. Many changes, modifications, alterations, and other uses and applications for the present device, however, will become apparent to those skilled in the art after considering this specification and the accompanying drawings. All such changes, modifications, alterations, and other uses and applications which do not depart from the spirit and scope of the invention are deemed to be covered by the invention which is limited only by the claims which follow.

What is claimed is:

1. Means for preventing inaccurate information from replacing accurate information in computers and the like during periods of temporary exposure to conditions which are likely to cause malfunctions comprising a data storage cell, a normal input circuit connected to the data cell, means connected to the input circuit for feeding data to said cell, an output circuit connecting said cell to a computer or the like, the improvement comprising means for periodically storing samples of the input data to the data cell, means for comparing succeeding stored data samples stored on the storing means, said comparison means including means for producing a control output signal whenever the compared data samples differ by greater than a predetermined amount, other means responsive to said control signals for establishing a circuit between the means for periodically storing samples and the data cell, said circuit rendering the normal input circuit to the data cell ineffective, and means for feeding the earlier of two compared data samples stored on the storing means to the data cell instead of the normal input thereto whenever the difference between the compared data samples exceeds said predetermined amount.

2. Means to prevent erroneous computer operations comprising a data cell having an input circuit, a signal source connected to said input circuit, an output circuit connecting the data cell to a computer or the like, means for temporarily storing selected data increments received from the data source, means for comparing succeeding stored input data increments, said comparing means including means for producing a control signal whenever the difference between the compared increments exceeds a predetermined amount, and means in the input circuit to the data cell responsive to said control signals to temporarily prevent communication between the data source and the input to the data cell and establishing an alternate circuit between the increment storage means and the input to the data cell, said last named means including means for feeding the earlier of the compared data increments stored in the temporary storing means to the data cell whenever the difference between the compared increments exceeds said predetermined amount.

3. The means to prevent erroneous computer operations defined in claim 2 wherein said increment storage means includes a magnetic unit having a rotating magnetic drum the surface of which is characterized by being capable of having data stored thereon, means for rotating said drum, a write head positioned adjacent to the drum and capable of storing data on the drum surface, means connecting the write head to the source of input data, and at least two read-out heads located at spaced locations on the drum relative to the write head to read out data increments previously stored thereon, one of said read out heads being positioned to read out data increments stored on the drum at an earlier time than the other read out head.

4. Means to prevent the loss and replacement of data contained in computers and the like during periods of temporary exposure to conditions likely to cause malfunctions capable of affecting the data therein comprising a computer including elements that are relatively susceptible to malfunction when exposed to transient conditions such as arcing, grounding, voltage and current surges, nuclear radiation, heat and shock, input means including means for feeding data increments to the computer, means connected to said input means for storing input data increments during predetermined time intervals, said storage means being constructed of a material that is relatively unaffected by the above-named transient and environmental conditions, increment comparison means connected to said storage means, means for feeding increments stored during succeeding time intervals to the comparison means, said comparison means including means for establishing a circuit for feeding increments stored in the storage means to the computer whenever the difference between the compared increments exceeds a predetermined amount, said last named means rendering the aforesaid computer input means ineffective.

5. The means defined in claim 4 wherein said storage means include a magnetic drum having a write head capable when excited of storing information thereon and at least two spaced read heads capable of reading out information previously stored at different times on the drum by the write head.

6. The means defined in claim 5 wherein said magnetic drum has a plurality of bands each capable of storing data increments, each of said bands having a write head and associated spaced read heads.

7. Means associated with a computer or the like to prevent loss of accurate data during periods of temporary exposure to transient conditions which are likely to produce unacceptable data and erroneous computer operations comprising a computer, computer input circuit means for feeding bits of data to the computer from an input source, storage means connected to the input source for storing selected samples of the input data taken at predetermined time intervals, said storage means including means for reading out data bits stored on the storage means at selected time intervals, means connected to the read out means including means for comparing the data bits stored on the storage means during succeeding time intervals, said comparing means including means for establishing a circuit for feeding data stored on the storage means to the computer instead of feeding to the computer inputs from the input circuit means whenever the difference between the compared data bits exceeds a predetermined amount.

8. The means defined in claim 7 wherein said storage means includes a magnetic drum including a plurality of magnetic drum portions, a plurality of spaced read heads and a write head associated with each drum portion, and means for rotating said drum at a predetermined speed.

9. The means defined in claim 7 wherein said data bits are binary bits.

10. The means defined in claim 8 wherein said each portion of the magnetic storage means includes means for storing different selected input data bits.

References Cited

UNITED STATES PATENTS

| | | | |
|---|---|---|---|
| 2,680,239 | 6/1954 | Daniels et al. | 235—167X |
| 2,935,734 | 5/1960 | Donan et al. | 235—167X |
| 3,050,251 | 8/1962 | Steele | 235—152UX |
| 3,167,645 | 1/1965 | Hoffmann et al. | 235—156 |
| 3,237,000 | 2/1966 | Booher | 235—156 |
| 3,378,641 | 4/1968 | Varsos et al. | 340—146.1UX |

EUGENE G. BOTZ, Primary Examiner

C. E. ATKINSON, Assistant Examiner

U.S. Cl. X.R.

235—153